United States Patent [19]

Zepf

[11] Patent Number: 4,606,581
[45] Date of Patent: Aug. 19, 1986

[54] INTERMEDIATE RING FOR PLURAL WHEEL SETS

[76] Inventor: Hans-Rudolf Zepf, Hirsackerstrasse 30, Horgen, Switzerland

[21] Appl. No.: 393,740

[22] Filed: Jun. 30, 1982

[30] Foreign Application Priority Data

Jul. 7, 1981 [CH] Switzerland .................. 4466/81

[51] Int. Cl.$^4$ ............................................. B60B 11/00
[52] U.S. Cl. ............................. 301/36 WP; 301/13 R
[58] Field of Search .......... 301/36 WP, 13 SM, 13 R, 301/8, 63 C, 63 PN; 152/155, 200, 339–342, 344, 376; 280/156

[56] References Cited

U.S. PATENT DOCUMENTS

| 1,260,146 | 3/1918 | Cope | 301/13 R |
| 2,603,267 | 7/1952 | Simpson | 301/63 C |

FOREIGN PATENT DOCUMENTS

| 2901606 | 7/1980 | Fed. Rep. of Germany | 301/36 WP |
| 2940834 | 4/1981 | Fed. Rep. of Germany | 301/37 R |
| 779745 | 4/1935 | France | 301/36 WP |
| 178464 | 7/1922 | United Kingdom | 301/13 R |

Primary Examiner—Robert B. Reeves
Assistant Examiner—Russell D. Stormer
Attorney, Agent, or Firm—Roylance, Abrams, Berdo & Goodman

[57] ABSTRACT

An intermediate ring includes an annular body with side walls from which cavities extend into the material of the body. The cavities from a web with radially extending web walls, which are inclined with respect to the ring axis. The web is radially relatively rigid, but axially resilient. As a result the intermediate ring retains its shape but can easily adapt to the different shapes of the gaps between the two tires of the wheel set.

4 Claims, 3 Drawing Figures

INTERMEDIATE RING FOR PLURAL WHEEL SETS

This invention relates to an intermediate ring for a wheel set of the type having adjacent double wheels, particularly for use on vehicles employed in the construction industry, the intermediate ring being positioned between the adjacent wheels.

BACKGROUND OF THE INVENTION

It is customary to provide travelling construction machines with wheel sets having double tires on at least one axle. The double tires are provided to withstand the frequently heavy loads to which such machines are subjected, and also to increase the possibility of cross-country travel. Such vehicles are used particularly at building sites wherein the tires on the wheels are subject to high loads and stresses. It is not possible to prevent foreign objects such as stones, rocks and the like from collecting in the gap between two adjacent tires, thus stressing and possibly damaging the side walls of the tires. Such damage makes it necessary to prematurely replace those tires which are very large and quite expensive.

It is known to incorporate an intermediate ring into the gap between adjacent tires in order to prevent entry of foreign bodies into the gap, an example of a ring of this type being shown in German AS No. 28 22 530. As shown therein, the intermediate ring body is made from a solid material, such as rubber, and its shape corresponds approximately to the lateral bounderies of the gap. Although this provides good closure of the gap, it is necessary to keep a number of ring sizes on hand in order to have an appropriate inventory, because the shape and width of the gap is dependent upon the construction of the wheel set and the particular tire used. In addition, a relatively large amount of material is required for the solid and heavy intermediate ring, causing the ring to be quite expensive even if less expensive base material, such as scrap rubber, is used for producing the rings.

BRIEF DESCRIPTION OF THE INVENTION

An object the present invention is to provide an intermediate ring of the general type described which can be used for a plurality of gap shapes and sizes, making it necessary to stock a relatively smaller number of such rings and, in addition, reducing the amount of material employed and the cost of each ring.

Briefly described, the invention includes an intermediate ring for installation between adjacent tires of a plural tire assembly on a vehicle including an annular body having generally flat inner, or hub face, and an outer, or circumferential, face, and axially directed side faces. The body has means defining a plurality of substantially uniformly distributed cavities extending inwardly from each of the side faces toward the opposite side face, thereby reducing the amount of material employed in making the ring.

It is particularly advantageous to arrange the cavities so that they alternately extend inwardly from one and then the other of the side faces into the ring material. If the cavities have a tapering shape, which is most conveniently a conical shape, and if the cavities are only arranged in the central area of the intermediate ring, i.e., approximately mid-way between the hub and circumferential faces, the resulting body structure has a web with radial web walls sloping with respect to the ring axis and facilitating the adaptation of the intermediate ring to different sized gaps between a solid circumferential ring part and a solid hub part.

In order that the manner in which the foregoing and other objects are attained in accordance with the invention can be understood in detail, a particularly advantageous embodiment thereof will be described with reference to the accompanying drawings, which form a part of this specification and wherein.

DETAILED DESCRIPTION OF THE DRAWINGS

Figure 1:
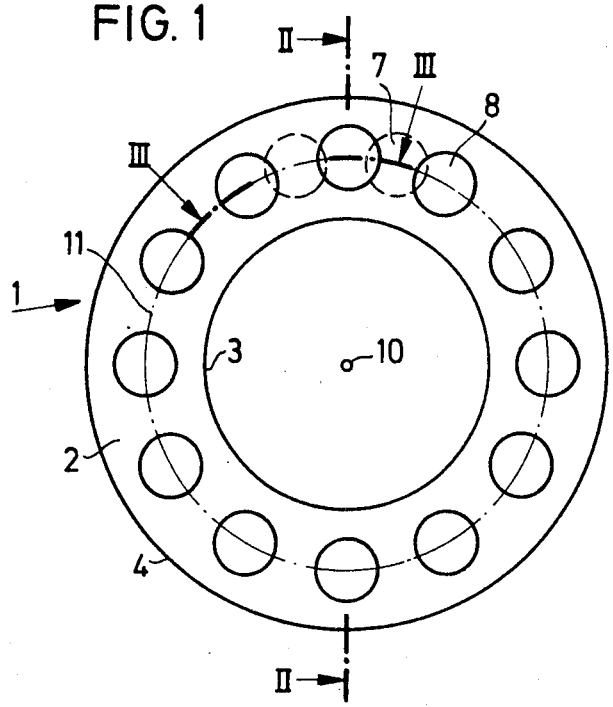
FIG. 1 is a side elevation of an intermediate ring in accordance with the invention.

As illustrated, an intermediate ring 1 comprises an annular body 2 of an elastomeric material, such as rubber, having an inner, substantially flat cylindrical face 3 with a diameter such that the intermediate ring can be placed over the hub structure of a wheel set. The body also has an outer, cylindrical, substantially flat circumferential face 4 which has a diameter sufficiently large to extend out to substantially close the gap between the tires.

The body also includes axial side faces 5 and 6 which are generally flat but which can be tapered so as to define rather shallow conical surfaces. Thus, surface 4 is axially larger than surface 3. Body 2 also includes means defining a plurality of generally axially extending cavities 7 and 8. Cavities 7 extend inwardly from face 5 of the body and cavities 8 extend into the material of the ring from surface 6. Each set of cavities thus defined is substantially uniformly distributed around the ring.

Figure 2:
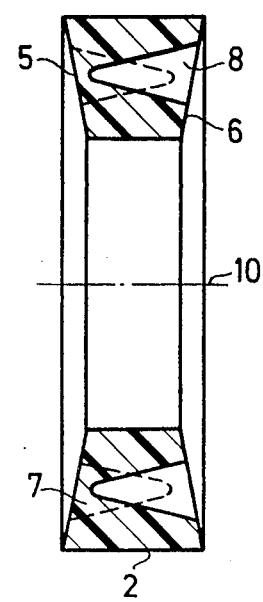
FIG. 2 is a front elevation, in section, along line II—II of FIG. 1.

As previously indicated, and as best seen in FIG. 2, side walls 5, 6 slope slightly so that the cross-section of annular body 2 is trapezoidal and its smaller parallel side faces toward the ring axis 10. As can be seen in FIG. 2, cavities 7 and 8 each have a conical shape, the axis of each cone being located on an intermediate circle 11, each axis of the cone being substantially parallel with ring axis 10. As will be seen in FIG. 1, cavities 7 extending inwardly from side wall 5 are circularly offset with respect to cavities 8 extending inwardly from side face 6. With this alternating arrangement, and by appropriately selecting the dimensions and location of the cavities, they can be arranged such that, when the projection of the openings is viewed in an axial direction, the cavity openings overlap each other as illustrated at the upper portion of FIG. 1.

Figure 3:
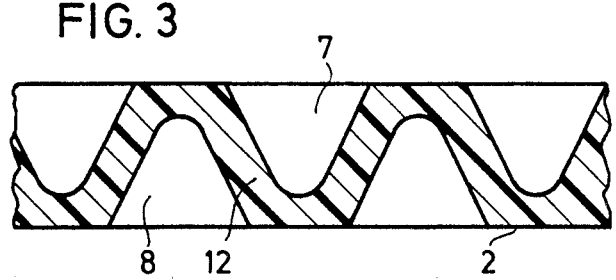
FIG. 3 is a fragmentary sectional view along the arcuate line III—III of FIG. 1.

The arrangement and number of cavities 7, 8 can be selected as a function of the requirements of the ring and, in a similar manner, the shape of cavities 7, 8 can differ from a conical shape. If the cavities 7, 8 are made conical, then a sinuous or zig-zag web 12 is formed in the central area of body 2, as shown in FIG. 3, with its walls extending radially and being inclined with respect to ring axis 10. The material between the cavities forms a web having radial web walls sloping with respect to the ring axis. As a result of this construction of web 12, a portion of the annular body 2 is formed in such a way that it is relatively rigid in the radial direction but relatively flexible in the axial direction. This is quite desirable and permits the ring 1 to easily adapt to the shape of the gap. In spite of the flexibility and adaptability, the annular body forms a good closure of the gap because in the vicinity of the circumferential face 4, annular body 2 has a ring part which is made from a solid material. As seen in FIGS. 1 and 2, a similarly solid ring is provided adjacent the hub base 3.

Web 12 also fulfills the requirement of reducing the amount of material required to make the intermediate ring. Cavities 7, 8 can also be formed so that they are continuous through the body. In such a structure, the web 12 is interrupted in the central area. As a function of the size of the intermediate ring, it is also possible to use a different shape for the cavities 7, 8. In any case, the ring would still form a clean seal on its circumference. Also, it does not change position in operation, as further achieved by the described shape of cavity 7, 8.

While certain advantageous embodiments have been chosen to illustrate the invention, it will be understood by those in the art that various changes and modifications can be made therein without departing from the scope of the invention as defined in the appended claims.

What is claimed is:

1. An intermediate ring for installation between adjacent tires of a plural tire assembly on a vehicle, comprising:
   an annular body having generally flat, axially extending, inner and outer faces and radially extending side faces, said annular body having an axial thickness between said side faces and an axis;
   a plurality of substantially uniformly distributed cavities axially extending inwardly into said annular body from each of said side faces in an alternating manner around said annular body, each of said cavities being located substantially midway between said inner and outer faces and extending axially for a distance greater than one-half of said axial thickness;
   a web between said cavities having radial web walls sloping relative to said axis; and
   at least one ring part of solid, uninterrupted material on said annular body.

2. An intermediate ring according to claim 1 wherein ring parts of solid material are formed on said inner and outer faces and extend axially between said side faces.

3. An intermediate ring according to claim 1 wherein said cavities are dimensioned and positioned sufficiently close to each other such that projections of openings of said cavities on opposite side faces overlap.

4. An intermediate ring according to claim 2, wherein each of said cavities has a conical shape.

* * * * *